Dec. 25, 1956  B. E. FREUND  2,775,417
FISHING REEL
Filed Oct. 13, 1953  2 Sheets-Sheet 1
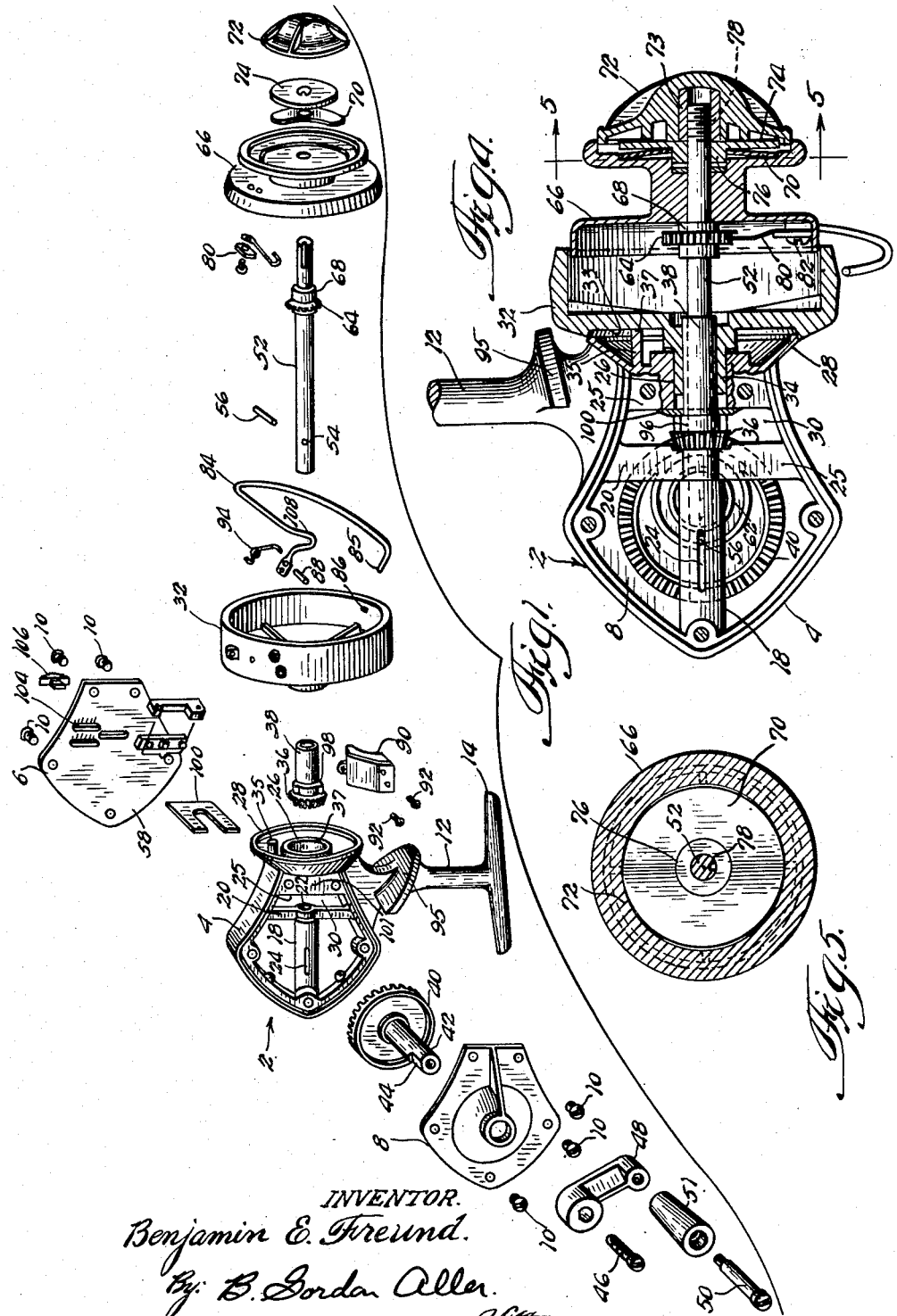
INVENTOR.
Benjamin E. Freund.
By B. Gordon Allen.

Dec. 25, 1956  B. E. FREUND  2,775,417
FISHING REEL
Filed Oct. 13, 1953  2 Sheets-Sheet 2
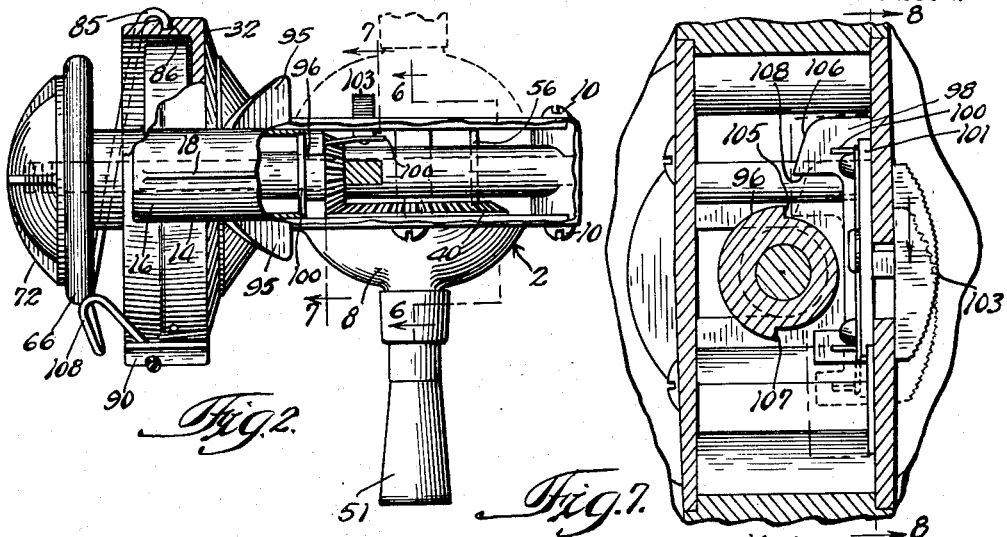
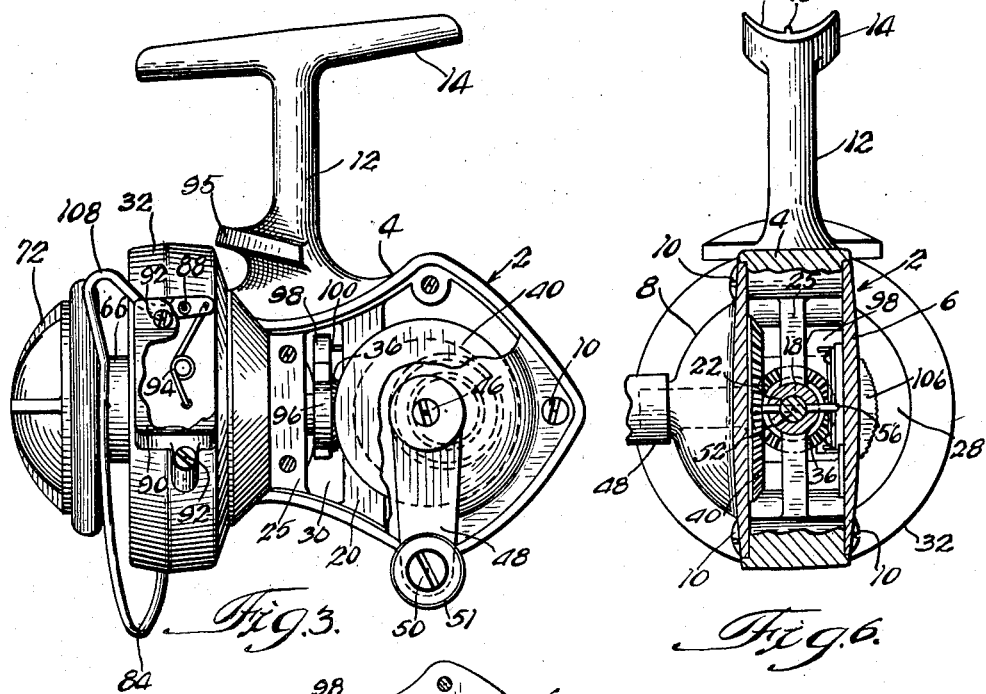
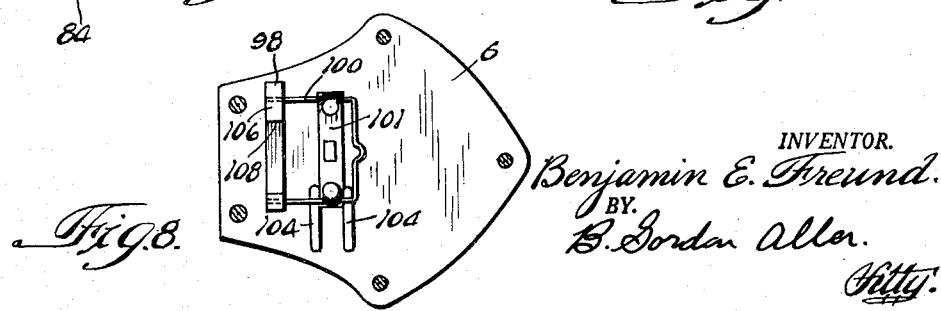
INVENTOR.
Benjamin E. Freund.
BY B. Gordon Allen.

United States Patent Office 2,775,417
Patented Dec. 25, 1956

2,775,417
FISHING REEL

Benjamin E. Freund, Chicago, Ill., assignor to Kleinzway, Inc., Chicago, Ill., a corporation of Illinois Application October 13, 1953, Serial No. 385,845

2 Claims. (Cl. 242—84.4)

This invention relates to fishing reels and more particularly to a novel spinning reel in which the spool or drum on which the line is wound remains stationary during a cast.

A general object of the invention is to devise a reel of rugged and simple construction and capable of long life in service.

Another object of the invention is to eliminate the necessity for lubrication by devising a reel in which all gears and rotating parts, as well as their bearings, are formed of a durable molded plastic, such as "nylon," which does not require lubrication.

Still another object of the invention is to prevent the foot of the reel from slipping on the pole surface to which the foot is clamped in the usual manner. This object is accomplished by providing a longitudinal rib on the arcuate pole engaging surface of the foot, whereby said rib is imbedded in the pole surface against which the foot is clamped.

Still another object of the invention is to devise a reel, the operating handle of which may be readily reversed to provide either a right-hand reel or a life-hand reel, as desired by the operator.

A further object of the invention is to devise novel means for producing an audible sound when the spool is rotated by tension on the line, as may be caused by a hooked fish.

Yet another object of the invention is to adjust tension on the line by a hooked fish. This object is accomplished by readily accessible means for adjustably developing spring pressure against the spool to resist rotation thereof.

A more specific object of the invention is to devise a reel such as above-described wherein the spool is reciprocated as line is wound thereon, as by a bail surrounding the spool and mounted on a rotatable housing therearound. In this connection it has been discovered that a ratio of two and seven-eighths revolutions of the housing per spool reciprocation prevents piling of the line on the spool as the line is wound thereon.

Another object of the invention is to devise a novel bail pivotal to casting and winding positions, said bail having novel spring means to yieldingly hold the bail in each of said positions, said bail being associated with cam means for urging the bail to line-winding position as the bail is rotated by the reel handle. The bail is preferably provided with a novel loop through which the line passes during winding or during unwinding by a hooked fish, said loop preventing the bail from being moved to open or casting position by tension on the line.

Still another object of the invention is to devise readily releasable means which, when actuated, accommodate rotation of the housing to wind line on the spool but restrain reverse rotation of the housing due to tension on the line by a hooked fish, said releasable means, when released, accommodating unencumbered rotation of the housing in either direction as may be desirable in winding line on the spool prior to hooking a fish.

The foregoing and other objects of the invention will become apparent from the following specification and the accompanying drawings, wherein:

Figure 1 is an exploded perspective view of a reel embodying the invention;

Fig. 2 is a top plan view of the reel shown in Fig. 1, with the foot and casing partly broken away;

Fig. 3 is a side elevational view taken from one side of the reel, with the gear housing and bail spring housing partly broken away;

Fig. 4 is another side elevational view taken from the other side of the reel and partly in central vertical section, with the cover-plate removed;

Fig. 5 is a sectional view on line 5—5 of Fig. 4;

Fig. 6 is a sectional view on line 6—6 of Fig. 2;

Fig. 7 is a sectional view on line 7—7 of Fig. 2 and

Fig. 8 is a view taken on line 8 of Fig. 7 in the direction of the arrows.

Describing the invention in detail, the novel reel comprises a casing generally designated 2, and including a body 4, a cover plate 6, and a gear housing 8, all preferably formed of a durable plastic, such as molded "nylon." The plate 6 and housing 8 are preferably removably connected to the body 4, as by screws 10, for convenient access to the interior of the casing 2, as may be desired in servicing the reel or in reversing the handle, as hereinafter described.

The body 4 comprises a leg 12 terminating in a foot 14 having an arcuate pole engaging surface or seat 16 adapted to be clamped in the usual manner against a complementary cork or other resilient surface of an associated fishing pole (not shown). The seat 16 comprises at least one rib 18 extending lengthwise thereof and adapted to be imbedded in the pole surface to positively position the casing 2 against movement relative thereto in service.

The body also comprises a cylinder or bearing portion (Figs. 1, 4 and 6) reinforced by a strut 20 and affording an internal bearing or socket 22 interrupted by a drive pin slot 24 extending transversely through the cylinder 18 for a purpose hereinafter described.

A forward end web or wall 25 of the body is provided with a bearing opening 26 and an annular flange 28 therearound, and it may be noted that the strut 20 is spaced from the forward end wall 25 of the body 24 to define a pinion gear slot 30 between the strut 20 and the bearing opening 26.

A ring or spool housing 32 has a recess 33 which receives the flange 28 and comprises an annular hub 34 rotatably fitted in the bearing opening. The flange 28 comprises a projection 35 having flat face engagement at 37 with the spool housing 32 within its recess 33, for the purpose of minimizing the bearing area between these parts.

A pinion gear 36 is provided with a hollow hub 38 fitted in the hub 34 and keyed thereto, preferably against all relative movement with respect thereto. Said gear 36 projects into the slot 30 and is meshed with a bevel drive gear 40 in the housing 8, the gear 40 having a hub 42 detachably keyed, as by a flat 44 (Fig. 1) and a screw 46 to a crank arm 48 which is detachably secured as by a screw 50 to a handle 51.

A drive shaft 52 is sleeved within the pinion gear 36 and socket 22 and is provided with a transverse opening 54 (Fig. 1) receiving a slidably fitted drive pin 56 which extends through the slot 24 to prevent rotation of shaft 52.

One end of the pin 56 is slidably received within a circular cam track 62 of the bevel gear 40, the center of said track being offset from the rotational axis of the bevel gear 40 whereby the latter reciprocates the drive shaft 52 as the housing 32 is rotated by gears 36 and 40 for a purpose hereinafter described.

The shaft 52 is provided adjacent its outer end with a ratchet 64 fixed thereon, said ratchet having a hub 68 affording a seat for the inner or rear side of a spool 66 which is frictionally clamped against the hub 68 of the ratchet by an annular spring plate 70, preferably in the form of a Belleville spring adjustably compressed against the outer or forward side of the spool 66, as by a nut or knob 72 having a fixed sleeve 73 threaded on the outer or forward end of the shaft 52, said nut 72 preferably bearing against a pressure plate 74 having a hub 76 sleeved within the plate 70 and splined as at 78 on the shaft 52.

The spool 66 is provided on its inner side with a clicker spring 80 detachably secured thereto as by a screw 82 and engageable with the teeth of the ratchet 64 to create a clicking noise, as hereinafter discussed, when the spool 66 is rotated by a tension on a line (not shown) wound around the spool.

The spool housing 32 is provided with a line pick-up bail 84, one end 85 of which is pivotally received within a complementary opening 86 of the housing 32. The bail 84 is also pivoted to the housing 32 adjacent the opposite end of the bail by a pivot pin 88 carried by a bail spring cover 90 removably attached as by screws 92 to the housing 32. The cover 90 contains a toggle spring 94 in the form of a coil having one end pivotally received within an opening of the housing 32 to anchor the spring 94 thereto. The opposite end of the spring 94 is detachably and pivotally anchored to the related end of the bail 84, whereby the spring yieldingly holds the bail in its open and closed positions for a purpose hereinafter described.

The body 4 is provided with a cam 95 for returning the bail 84 to closed or line pick-up position upon rotation of the housing 32, as hereinafter described.

Preferably releasable means are provided for preventing reverse rotation of the pinion and housing 32 as when the line (not shown) on the spool is under tension by a hooked fish, said means comprising a cam 96 on the pinion gear hub 38.

The cam 96, as best seen in Fig. 3, is aligned with a cam follower 98 resiliently mounted by a wire spring 110 on a slide 102 (Figs. 3 and 7), which is connected to the inner side of a button 103, said slide being guided by ribs 104 on the inner side of cover plate 6. When button 103 is in its uppermost position, as shown by solid lines in Fig. 7, rotation of housing 32 and gear 36 in either direction is unrestrained; however, when button 103 is manually actuated to its lowermost position indicated by phantom lines in this figure, reverse rotation of the housing 32 and gear 36 is positively limited by engagement of cam face 105 with follower face 106. Under these conditions, rotation of housing 32 and gear 36 in a direction to wind line on spool 66 is permitted by flexing of spring 100 upon engagement of cam face 107 with follower face 108 at each revolution of the cam 96. This action develops a slight clicking noise each time cam face 107 strikes follower face 108, thereby indicating to the operator that the anti-reverse mechanism 96, 98 is operating.

In using the reel, assuming that a line is wound on the spool 66, the bail is moved manually outwardly to casting position and the line is held in one hand while the pole is manipulated with the other hand to effect a cast, at which time the line is released by said one hand and unwinds from the spool 66, which remains stationary.

When the cast is completed, the operator rotates the handle to retrieve the line, whereupon the bail 84 strikes the cam 95, which automatically urges the bail to line pick-up position, whereupon the line passes through a loop 108 as the housing is rotated to wind the line on the spool. In this connection it has been found that a gear ratio which provides two and seven-eighths revolutions of the housing per reciprocation of spool 66, prevents the line from piling on the spool as the housing 32 and bail 84 rotate and the spool 66 reciprocates during rotation of the handle.

In the event that a fish strikes and puts the line under tension, the operator pushes button 103 down so that the cam 96 and follower 98 prevent reverse rotation of the handle as the fish pulls the line through the loop 108 rotating the spool 66 on the shaft 52, whereupon the ratchet and spring make a clicking noise. At this time the operator may adjust tension on the line by operating the nut 72 to adjust pressure of spring 70 which frictionally resists rotation of the spool 66. The loop 108 prevents any tendency of the bail 84 to pivot to open position thereof due to tension on the line.

It may be noted that a primary advantage of the novel construction is the ease with which an operator may reverse the handle 51 to right or left-hand position by interchanging the plate 6 and gear housing 8 together with its bevel gear 40.

Another important aspect of the invention resides in the novel arrangement and form of the parts, as above described, so that all parts except the Belleville spring, the drive shaft 52, and the drive pin 54, the threaded sleeve 73 and the various screws may be formed of a molded plastic, such as molded "nylon," thereby avoiding the necessity of oiling the movable parts and preventing corrosion and excessive wear thereof. Molded "nylon" is also extremely light and has a tensile strength of 13,000 pounds per square inch, thereby insuring long life in service. The metal parts above mentioned are preferably formed of stainless steel or other non-corrosive metal.

While the present invention has been explained and described with reference to specific embodiments of structure, it will be understood, nevertheless, that numerous modifications and variations are susceptible of being incorporated without departure from the essential spirit or scope thereof. Accordingly, it is not intended for an understanding of this invention to be limited by the foregoing description nor by the illustrations in the annexed drawings, except as indicated in the hereinafter appended claims.

What is claimed as new and desired to be secured by Letters Patent of the United States is as follows:

1. A fishing reel comprising a line-storing spool, a drive shaft fixed to said spool against movement relative thereto axially of the shaft, a casing receiving said shaft, a pinion gear sleeved over the shaft and rotatably mounted in the casing, said casing comprising a pair of readily removable side plates, a guide slot in the casing extending generally parallel to the longitudinal axis of the shaft, a bevel gear rotatably mounted on one side plate and meshed with the pinion gear, rotatable means surrounding the spool and keyed to the pinion gear for rotation thereby in one direction to wind line on the spool, releasable means in the casing for restraining rotation of the pinion in the opposite direction, a circular groove in said bevel gear, said groove having its center offset from the rotation axis of the bevel gear, a pin slidably fitted in a transverse opening of the shaft, said pin being received in said slot and said groove, said spool being rotatable on said shaft in response to tension on said line, means operatively connected to the spool and shaft for producing a noise in response to rotation of the spool, means on the outer end of said shaft for adjustably resisting rotation of the spool, a handle externally of the casing connected to the bevel gear, and a button carried by the other side plate externally of the casing for actuating and releasing said restraining means, said releasable means in the casing being characterized by a cam surface on the pinion gear, a spring anchored to said button, and a cam follower carried by said spring for engagement with said cam surface in one position of said button.

2. A fishing reel comprising a body formed of moulded plastic, a housing formed of moulded plastic having an annular hub rotatably fitted in a bearing opening of said body, said body having an annular flange around said opening received within a complementary recess in said housing, a lug on said flange bearing against said housing in said recess to minimize bearing area between the housing and flange, a pinion gear formed of moulded plastic having a hub keyed to said annular hub, a line-storing spool supported by said body forwardly of said housing, means on said housing for winding line on said spool, and gear means carried by the body and operatively connected to said pinion gear for rotating the same.

References Cited in the file of this patent

UNITED STATES PATENTS

| | | |
|---|---|---|
| 2,495,621 | Young et al. | Jan. 24, 1950 |
| 2,498,987 | Duncan | Feb. 28, 1950 |
| 2,546,465 | Martini | Mar. 27, 1951 |
| 2,712,419 | Martini | July 5, 1955 |

FOREIGN PATENTS

| | | |
|---|---|---|
| 471,218 | Great Britain | Aug. 31, 1937 |
| 473,239 | Great Britain | Oct. 8, 1937 |
| 848,152 | France | July 17, 1939 |
| 889,493 | France | Oct. 4, 1943 |
| 411,006 | Italy | June 19, 1945 |
| 924,148 | France | Mar. 3, 1947 |
| 430,909 | Italy | Feb. 20, 1948 |
| 972,689 | France | Aug. 30, 1950 |
| 974,227 | France | Sept. 27, 1950 |
| 1,008,291 | France | Feb. 13, 1952 |